(12) United States Patent
Fujiwara

(10) Patent No.: US 7,047,492 B2
(45) Date of Patent: May 16, 2006

(54) DOCUMENT MANAGEMENT SYSTEM

(75) Inventor: Akihiko Fujiwara, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 388 days.

(21) Appl. No.: 10/608,041

(22) Filed: Jun. 30, 2003

(65) Prior Publication Data

US 2004/0268254 A1 Dec. 30, 2004

(51) Int. Cl.
*G06F 15/00* (2006.01)

(52) U.S. Cl. .................. 715/530; 715/511; 715/513

(58) Field of Classification Search ............... 715/530, 715/511, 513; 726/26, 27
See application file for complete search history.

(56) References Cited

U.S. PATENT DOCUMENTS 5,897,643 A * 4/1999 Matsumoto ............. 715/511
6,314,457 B1 11/2001 Schena et al.
6,819,806 B1 * 11/2004 Kubota et al. ........... 382/309
2001/0003819 A1 * 6/2001 Matsumoto ............. 707/500
2002/0114013 A1 * 8/2002 Hyakutake et al. ...... 358/3.28

FOREIGN PATENT DOCUMENTS

JP 2002-542538 A 12/2002

* cited by examiner

*Primary Examiner*—Stephen Hong
*Assistant Examiner*—David Faber
(74) *Attorney, Agent, or Firm*—Foley & Lardner LLP

(57) ABSTRACT

A system and method for managing documents includes storing a first document having a first style in a document repository, creating an identification (ID) associated with the first document, providing a discernment information table, the discernment information table including the ID associated with the first document, and providing a related information table, the related information table including the ID and related information of the first document, the related information including at least an operational history of the first document.

20 Claims, 9 Drawing Sheets

DOCUMENT MANAGEMENT SYSTEM

FIELD OF THE INVENTION

The present invention relates generally to a document management system and method.

BACKGROUND OF THE INVENTION

In existing document control systems, information related to a document, such as its properties and operational history, is managed to accompany the document data based on the document storing method or based on the document form. The related information may be managed according to the storing method such as, for example, by the storage location on a storage device and the file system, or the storage form on a client/server system. The related information may also be managed according to the document form such as, for example, by the document media type (such as paper or electronic) or document format (such as bitmap, PDF, or URL).

Documents in paper form may also be associated with a related document in electronic form. For example Japanese Publication No. 2002-542538 discloses scanning a paper document with a bar code or electronic watermark on the paper to produce electronic data, and scanning the code on the paper as well.

It would be useful to provide a document management system which organizes related documents having different forms and storing methods, and that manages and organizes the related information of these documents so that the information may be linked and readily analyzed.

SUMMARY OF THE INVENTION

Briefly, in one aspect of the invention, a system and method for managing documents includes storing a first document having a first style in a document repository, creating an identification (ID) associated with the first document, providing a discernment information table, the discernment information table including the ID associated with the first document, and providing a related information table, the related information table including the ID and related information of the first document, the related information including at least an operational history of the first document.

Further features, aspects and advantages of the present invention will become apparent from the detailed description of preferred embodiments that follows, when considered together with the accompanying drawing figures.

DETAILED DESCRIPTION OF THE PREFERRED EMBODIMENTS

Figure 1:
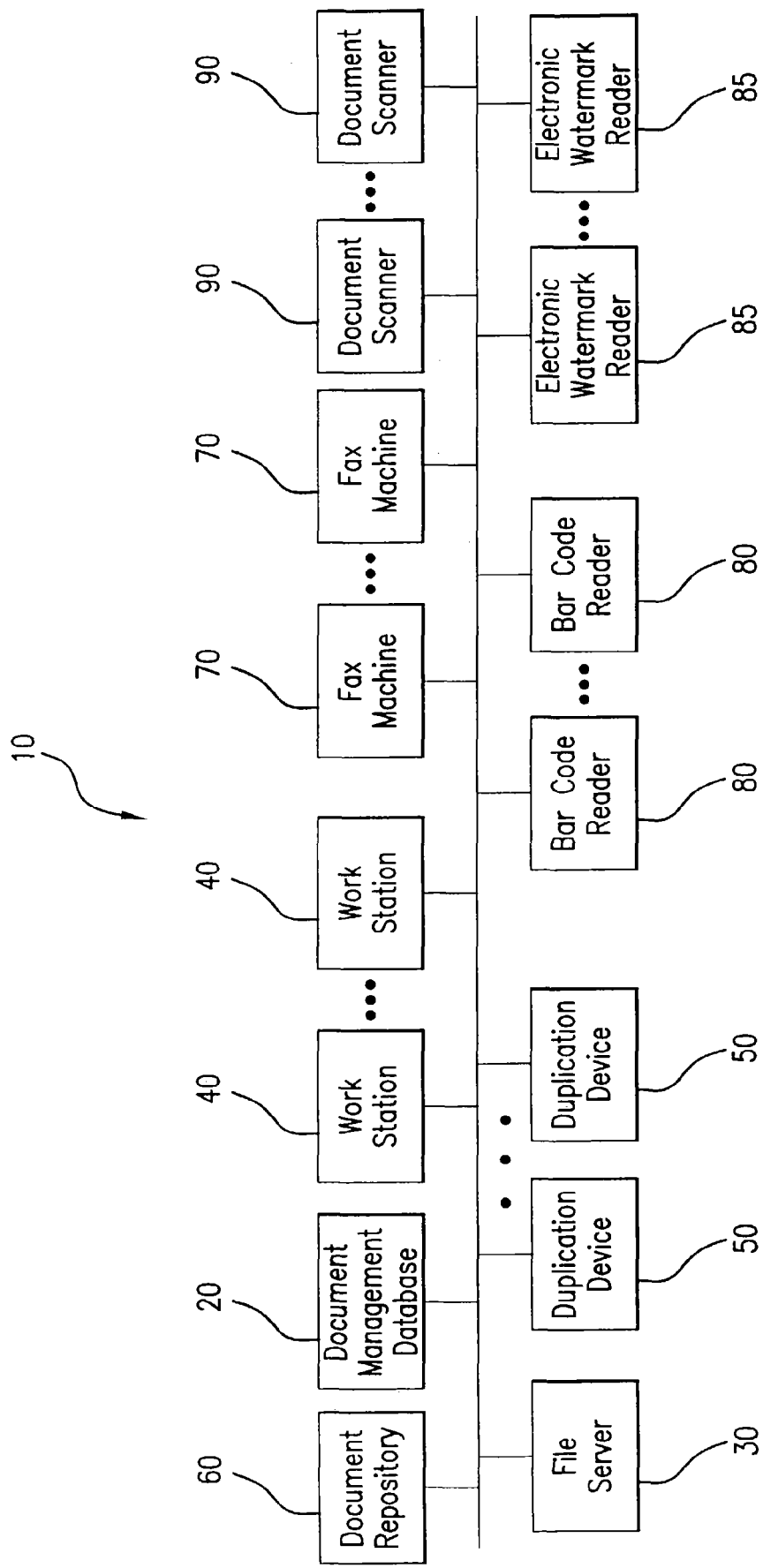
FIG. 1 is a block diagram of a document management system according to an embodiment of the present invention.

FIG. 1 is a block diagram depicting a document management system according to an embodiment of the present invention. As shown in FIG. 1, the document management system 10 includes a document management database 20, a file server 30, a number of work stations 40, a number of duplication devices 50, and a document repository 60. The document management system may also include fax machines 70, bar code readers 80, electronic water mark readers 85, and document scanners 90. Each of these components may be coupled together by a network connection or by a direct communication connection. Further some of the components may have multiple functions. For example, the duplication devices 50 may also function as document scanners 90 or other types of multi-function peripherals.

Each workstation 40 may be a PC, a mobile phone, a PDA, a magnetic card, or some combination thereof, or any other computing structure. Each workstation 40 preferably includes a CPU, a main memory, a ROM, a storage device and a communication interface all coupled together via a bus. The CPU may be implemented as a single microprocessor or as multiple processors for a multi-processing system. The main memory is preferably implemented with a RAM and a smaller-sized cache. The ROM is a non-volatile storage, and may be implemented, for example, as an EPROM or NVRAM. The storage device can be a hard disk drive or any other type of non-volatile, writable storage.

The communication interface for the workstations 40 provides a two-way data communication coupling, such as to a network. For example, if the communication interface is an integrated services digital network (ISDN) card or a modem, the communication interface provides a data communication connection to the corresponding type of telephone line. If the communication interface is a local area network (LAN) card, the communication interface provides a data communication connection to a compatible LAN. Wireless links are also possible. In any such implementation, the communication interface sends and receives electrical, electromagnetic or optical signals, which carry digital data streams representing different types of information.

Like the workstations 40, the file server 30 preferably includes a CPU, a main memory, a ROM, a storage device and a communication interface all coupled together via a bus.

The file server 30 stores a plurality of documents in a non-volatile storage area, such as a hard disk drive or NVRAM. The document management database 20 includes information about documents and users of documents stored in the file server 30. In addition to information identifying the users and documents, the document management database 20 also includes information about the access rights the users have to respective documents stored in the file server 30. The information included in the user management database 20 may be stored in a non-volatile storage area, such as a hard disk drive or NVRAM. The document repository 60 includes stored documents and may be part of the file server 30, or, as shown, separate therefrom. The documents included in the document repository 60 may be stored in a non-volatile storage area, such as a hard disk drive or NVRAM.

The duplication devices 50 can be copiers, printers, or other devices which can be connected to the file server 30, and they can make document copies on a medium, such as on paper or on a transparency.

As shown in FIG. 1, the workstations 40, document management database 20, file server 30, duplication devices 50, fax machines 70, bar code readers 80, electronic water mark readers 85, and document scanners 90 may all be part of the same local network.

Figure 2:
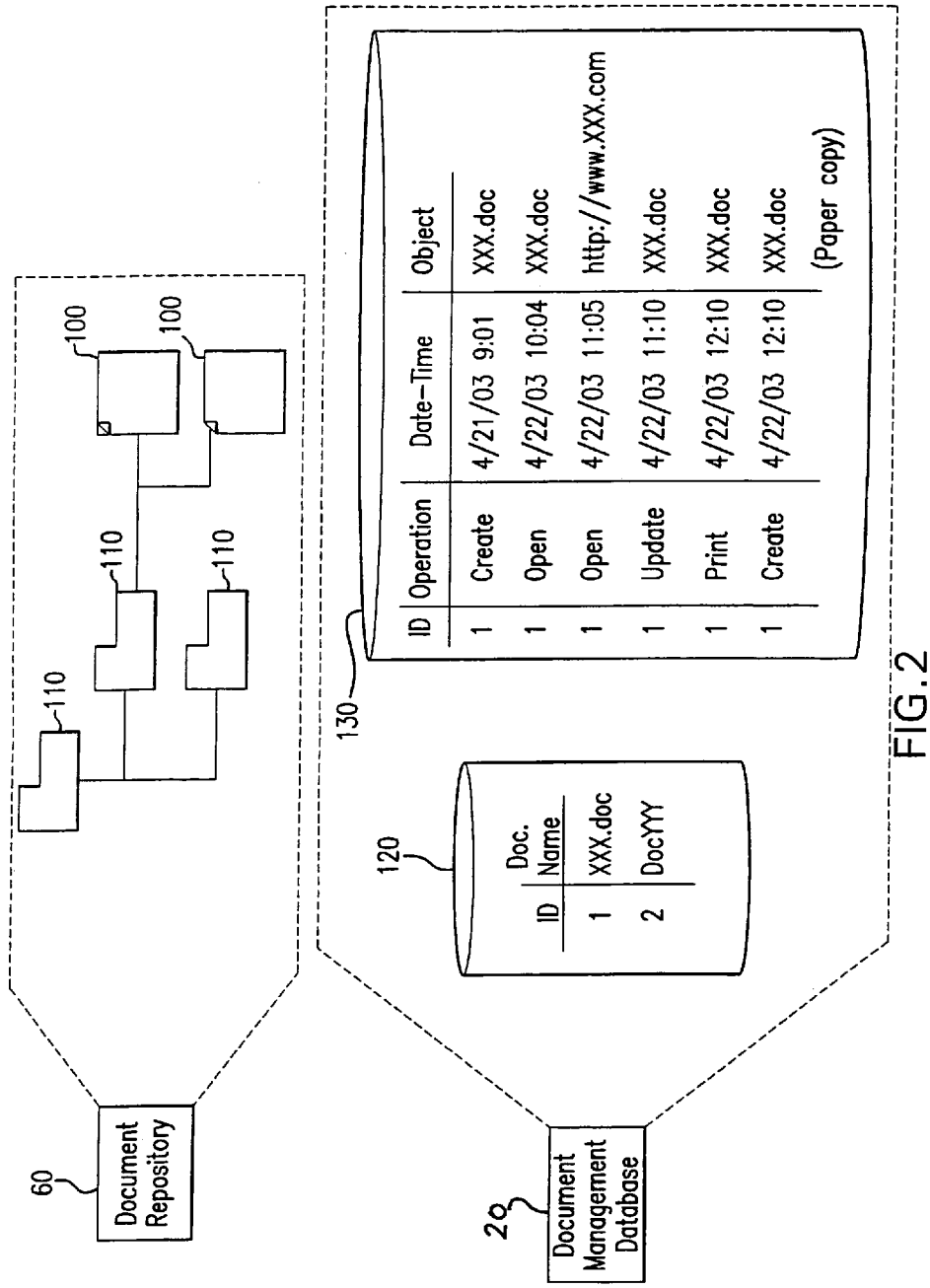
FIG. 2 is a detailed diagram of a document repository and user management database of the document management system of FIG. 1, according to an embodiment of the present invention.

FIG. 2 illustrates the organization of the document repository 60 and the document management database 20 in more detail. The document repository 60 includes documents 100 organized in folders 110. As shown in FIG. 2 the folders 110 may be organized in a hierarchical fashion with some of the folders acting as subfolders and being contained within folders at higher levels, and some folders containing documents 100. As understood in the art, the number of levels of folders can be quite large.

The document management database 20 includes information about the documents in the form of a discernment information table 120 and a related information table 130. These tables can be integrated with one another, or be separate. The discernment information table 120 includes an identification (ID) (such as a number) associated with a document and the name of the document. In the example shown in the FIG. 2, the discernment information table 120 includes a document name "XXX.doc" and an ID "1," associated with that document. The discernment information table 120 also includes a name of a second document "DocYYY" along with its associated ID "2." Because the IDs are not the same in the discernment table for the two documents listed, "XXX.doc" and "DocYYY" are not "related" to each other.

The related information table 130 includes related information associated with each of the documents in the discernment table 120. The related information includes at least the organization operational history of a document, such as the date and time that a file was operated on, and the operations indicating that a file was created, edited, opened, closed, faxed, scanned, printed (or otherwise image processed) or sent as an e-mail. The related information may also include the name of the document. In addition to the related information, the related information table 130 includes the ID of a document, and may further include the document form and the document storing method.

The document form includes the type of medium upon which the document was stored, such as paper or electronic storage. The document form includes the document format, such as PDF, bitmap, URL, or a particular software storage format. The document storing method includes the method for saving and storing the document, such as the folder/file system in the operating system (OS) file system, document management system, client/server or file server information. In this embodiment, the document style includes both the document form and the document storing method.

Figure 3:
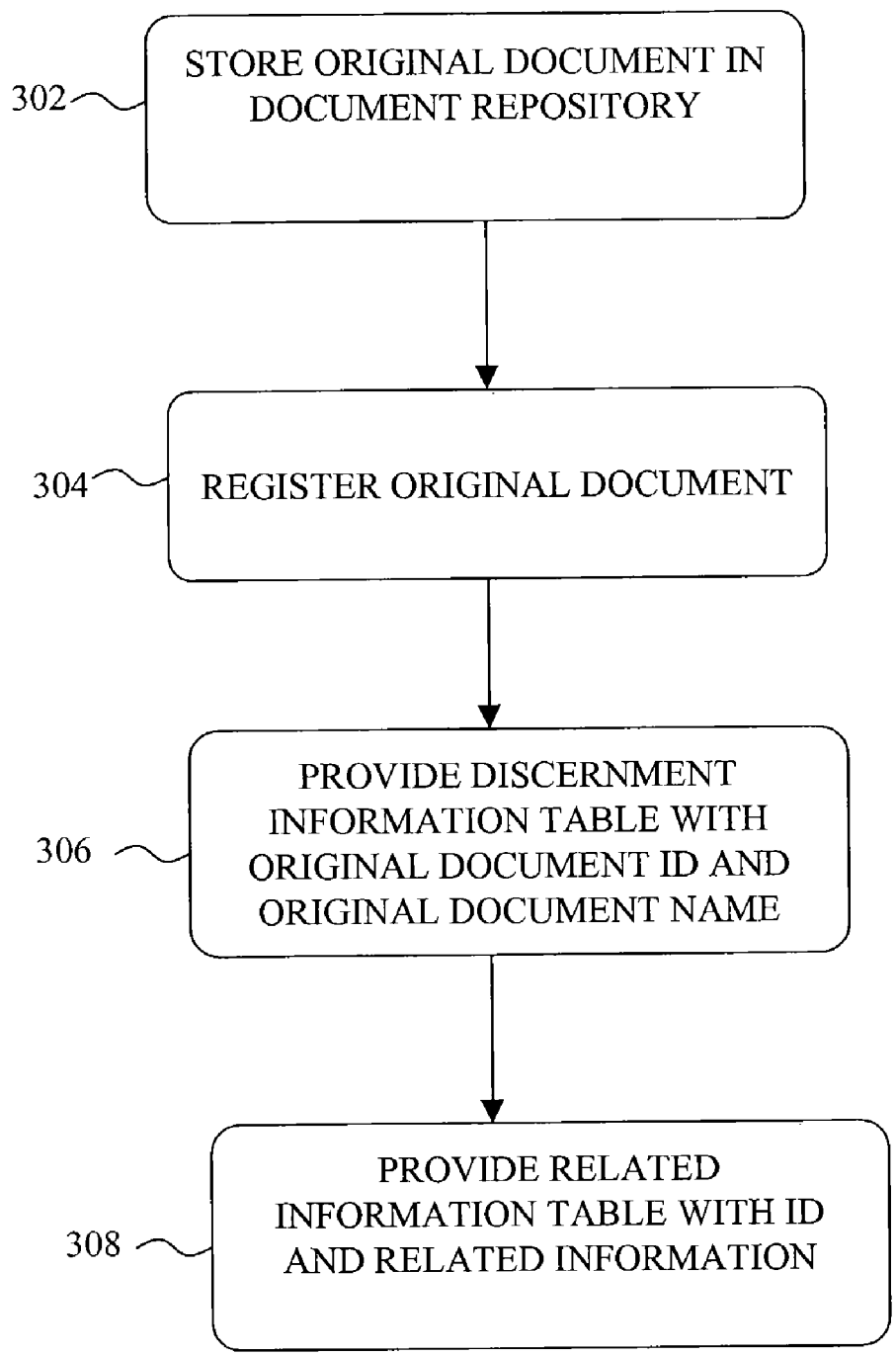
FIG. 3 is a flow diagram of a method of managing documents according to an aspect of the present invention.

FIG. 3 is a flow diagram of a method for managing documents according to an aspect of the invention. As shown in FIG. 3, a user first creates and stores an original document in the document repository 60 (step 302). At this time the original document is registered (step 304) with the document management database 20. A unique ID is provided for the original document. A discernment information table 120 is provided (step 306). The discernment information table 120 includes at least the unique ID associated with the original document, and can include the name of the original document.

A related information table 130 is also provided (step 308). The related information table 130 includes the unique ID associated with the original document, and related information of the original document. The related information for the original document includes at least the operational history of the original document.

Figure 4:
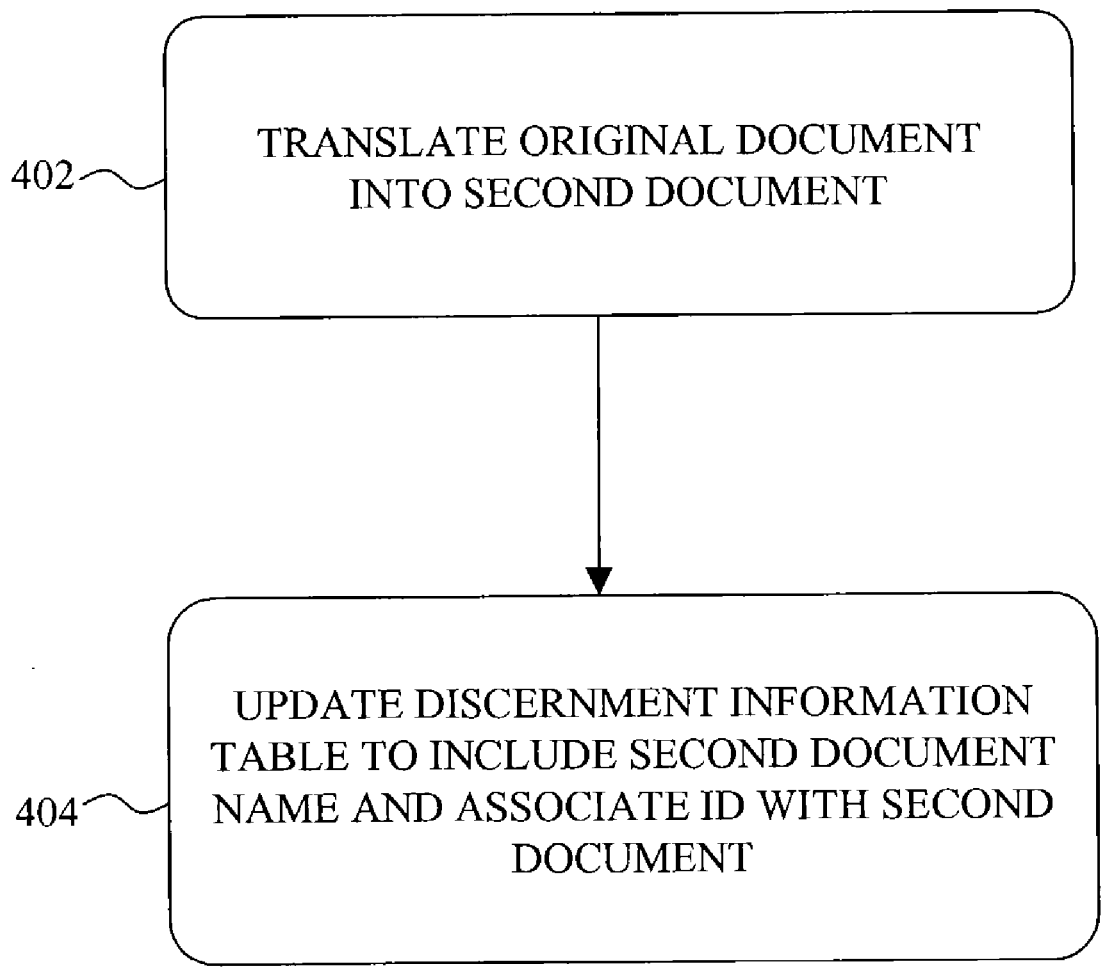
FIG. 4 is a flow diagram of a method of managing documents according to an aspect of the present invention.

FIG. 4 is a flow diagram of a method for managing documents according to a further aspect of the invention. The original document is translated to a second document (step 402). In this application, an initial document is translated to another document having a different style than the initial document. That is, the method by which the initial document is stored is changed, and/or the form of the initial document is changed.

Translating the original document creates the second document. The discernment information table 120 is updated to include the name of the second document, which will be different from the name of the original document, and to associate the ID with the second document (step 404). Thus, the same ID is associated with both the original document and the second document, although these two documents have different styles.

The related information table 130 is modified to include related information of the second document. This related information includes at least the operational history of the second document. Associating the ID with both the original and second document links their related information in the related information table 130, so users can cluster the related information of these documents together.

Figure 5A:
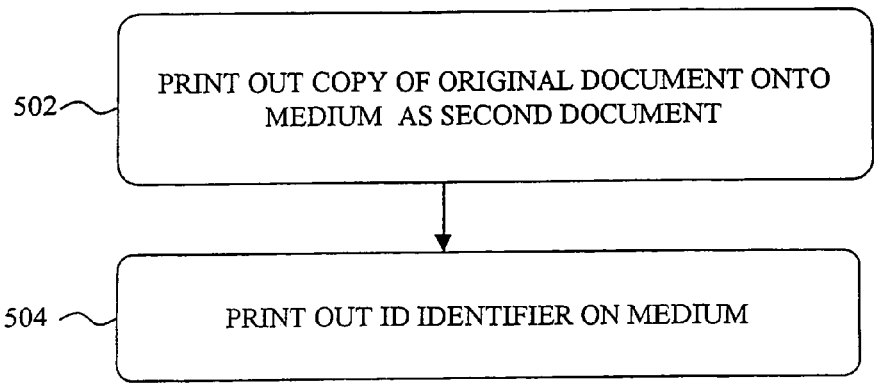
FIGS. 5A and 5B are flow diagrams of a method of managing documents according to an aspect of the present invention.
Figure 5B:
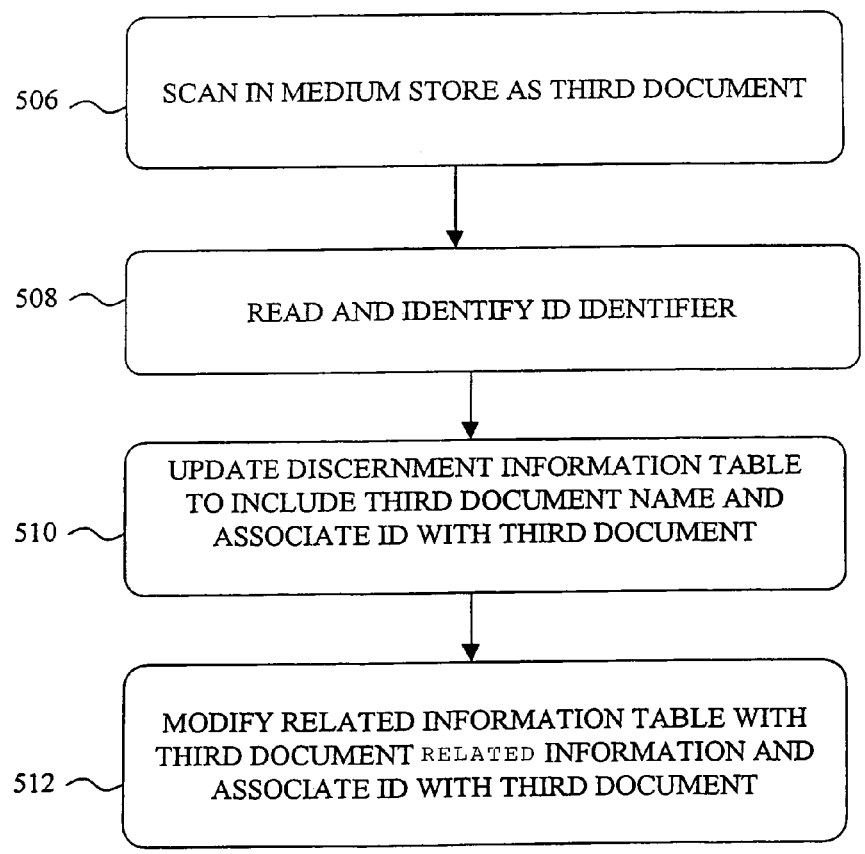

FIGS. 5A and 5B are flow diagrams of a method for managing documents according to further aspects of the invention. In FIGS. 5A and 5B, the original document is translated to a second document by printing out a copy of the first document onto a medium (step 502). Any of various printing devices, such as one of the duplication devices 50, can be used to print out the original document, creating a second document. Along with printing a copy of the original document, an ID identifier is printed onto the medium (step 504). The ID identifier associates the ID with the second document. The ID identifier may be in the form of a readable bar code or an electronic water mark, for example. The ID identifier may be printed on the medium concurrently with the copy of the original document, or at a different time. The ID identifier links the second document, which is printed out, to the original document.

The medium is scanned in (step 506), such as by using a document scanner 90. Scanning the second document translates it into a third document, which third document may be stored in the document repository 60. The third document can take on various forms, such as a bit map or PDF file.

The ID identifier on the second document is read and identified (step 508), such as by a bar code reader 80 or electronic water mark reader 85. The discernment information table 120 is updated to include the name of the third document and the ID, thus associating the ID with the third document (step 510).

The related information table 130 is also modified to include the related information and the ID now associated with third document (step 512). The related information of the third document includes at least its operational history. By having the ID associated with the original, second and third documents, this links the related information in the related information table 130 of the original, second and third documents, and a user can cluster related information of all these documents together.

In the method of FIGS. 5A and 5B, as an alternative, when registering the original document in the document management database, any URLs referred to can be captured as well. Then, at the time of creating the second document by printing the original document, along with printing the ID, other information such as a referred URL (or other lower ranking security information), can be printed onto the paper. Then, when scanning the document to create a third document, should the document management database not be available, then the referred/URL (or other lower ranking information) is printed onto the medium along with the copy.

Figure 6:
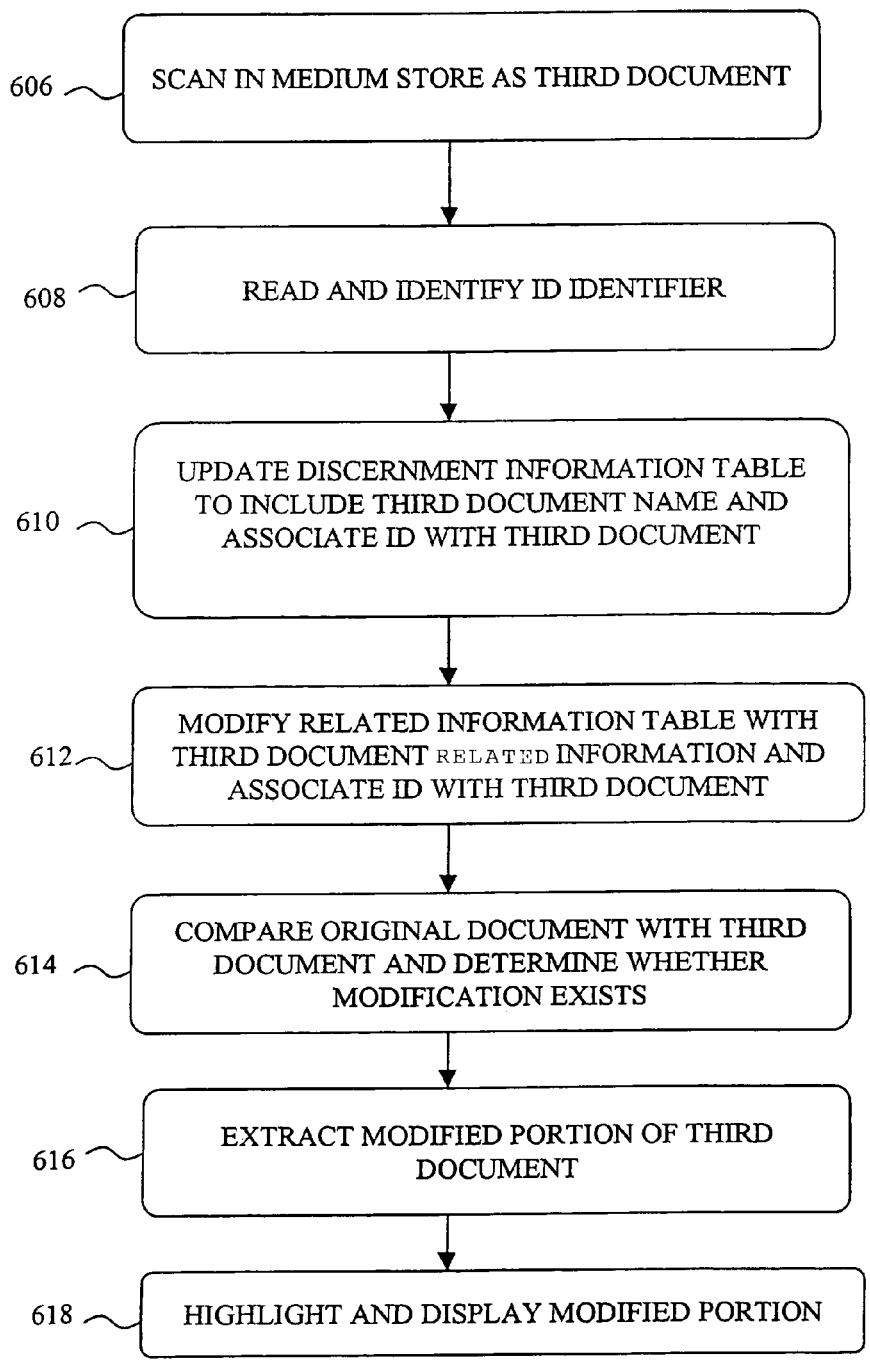
FIG. 6 is a flow diagram of a method of managing documents according to an aspect of the present invention.

FIG. 6 is a flow diagram of a method for managing documents according to yet another aspect of the invention. In FIG. 6, a document based on an original document is modified after it is created, and translated to a third document after the modification, and then the third document is compared to the original document.

First, steps 502 and 504 are performed as shown in FIG. 5A. The medium of the second document is modified, such as by writing or pasting a modification on the medium. The modified medium is scanned in (step 606), translating the second document to a third document, and the third document may be stored in the document repository 60. The third document can have various forms, such as a bit map or PDF file.

The ID identifier on the second document is read and identified (step 608), and the discernment information table 120 is updated to include the name of the third document and the ID, thereby associating the ID with the third document (step 610).

The related information table 130 is modified to include the related information and associated ID of the third document (step 612). The related information of the third document includes at least its operational history. By having the ID associated with the original, second and third documents, this links the related information in the related information table 130 of the original, second and third documents, and a user can cluster related information of all these documents together.

The original and third documents are compared to determine whether the third document is a modification of the original document (step 614). The comparison may be performed using comparison software stored in the file server 30, for example. The comparison may include converting the original and/or third documents to a same form so that a comparison may be more easily performed. For example, if the third document is stored in a bit map format, the original document may be converted to a bit map format for the comparison.

The related information table 130 may then be modified to indicate that the third document is a modified version of the first document, assuming that is the case.

Additionally, a modified portion of the third document may be extracted (step 616) based on comparing the original and third documents. The modified portion may then be highlighted and displayed (step 618), such as on a display of one of the work stations 40, so that a user can readily view the differences.

Figure 7:
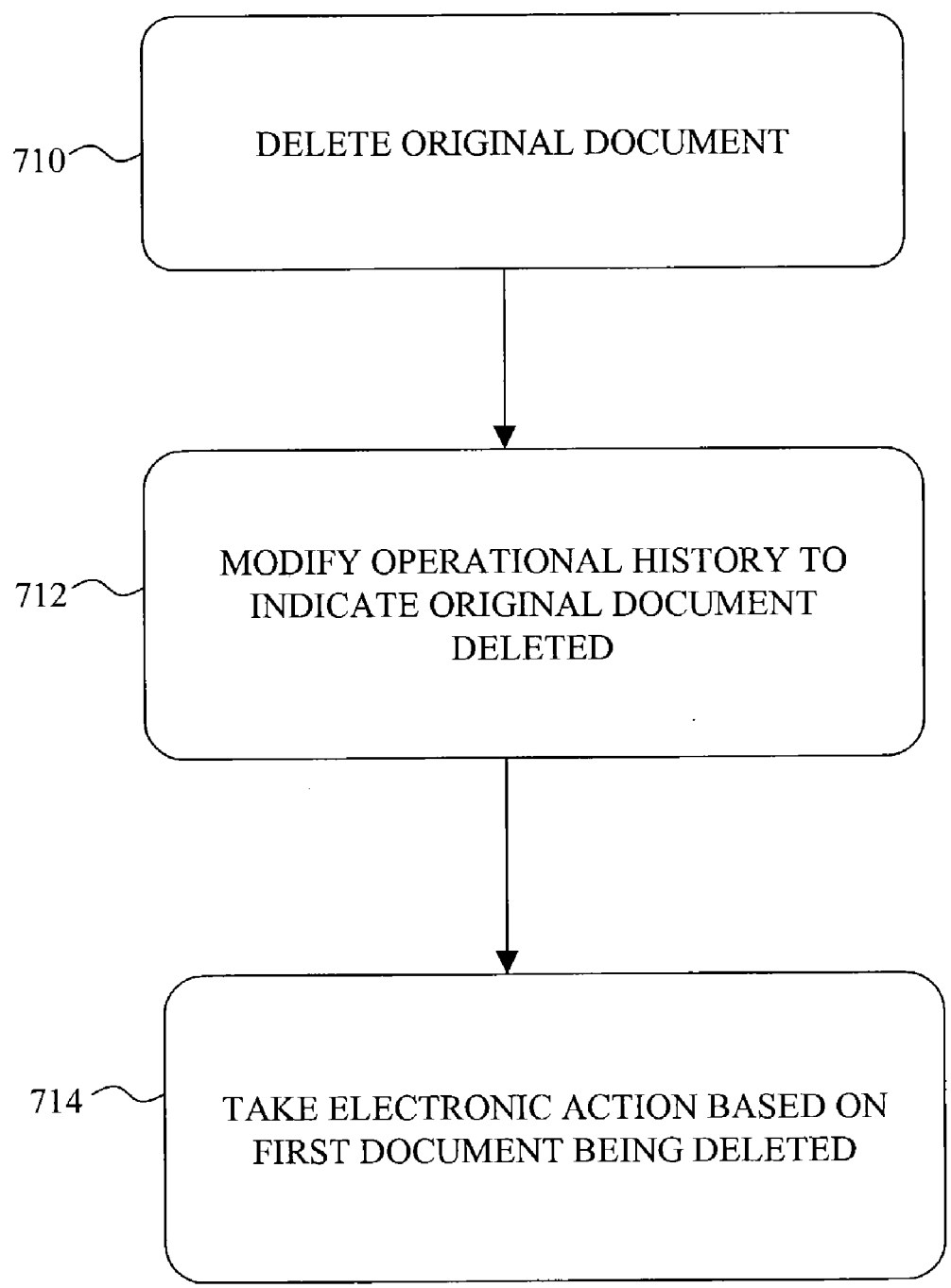
FIG. 7 is a flow diagram of a method of managing documents according to an aspect of the present invention.

FIG. 7 is a flow diagram of a method for managing documents according to a further aspect of the invention. In FIG. 7, when an original document is deleted, the operational history in the related information table 130 is modified accordingly. Should any related documents with the same ID be created, a user may be warned that the original document is deleted and the user may take appropriate action.

A second document is translated from an original document, such as for example, by printing out a copy of the original document onto a medium, and an ID identifier is printed on the medium associating the second document with the ID of the original document. In this regard, steps 502 and 504 may be performed as outlined with respect to FIG. 5A. The medium is scanned and thus translated to a third document, and the ID identifier is read and identified. In this regard, steps 506 and 508 may be performed as outlined with respect to FIG. 5B.

Returning to FIG. 7, the original document is deleted (step 710), which can occur any time after translating the original document to the second document. When the original document is deleted, the operational history is modified in the related information table to indicate that the original document is deleted (step 712). An electronic action may be taken based on the first document being deleted (step 714). For example, a message may be displayed indicating that the original document has been deleted. This message may be displayed, for example, when the second document is translated to the third document. In this regard, the message may notify the user that the original document has been deleted, and ask the user if the third document should be saved to replace the original document. Alternatively, if the original document has been deleted, the third document may automatically be saved to replace the original document.

Figure 8:
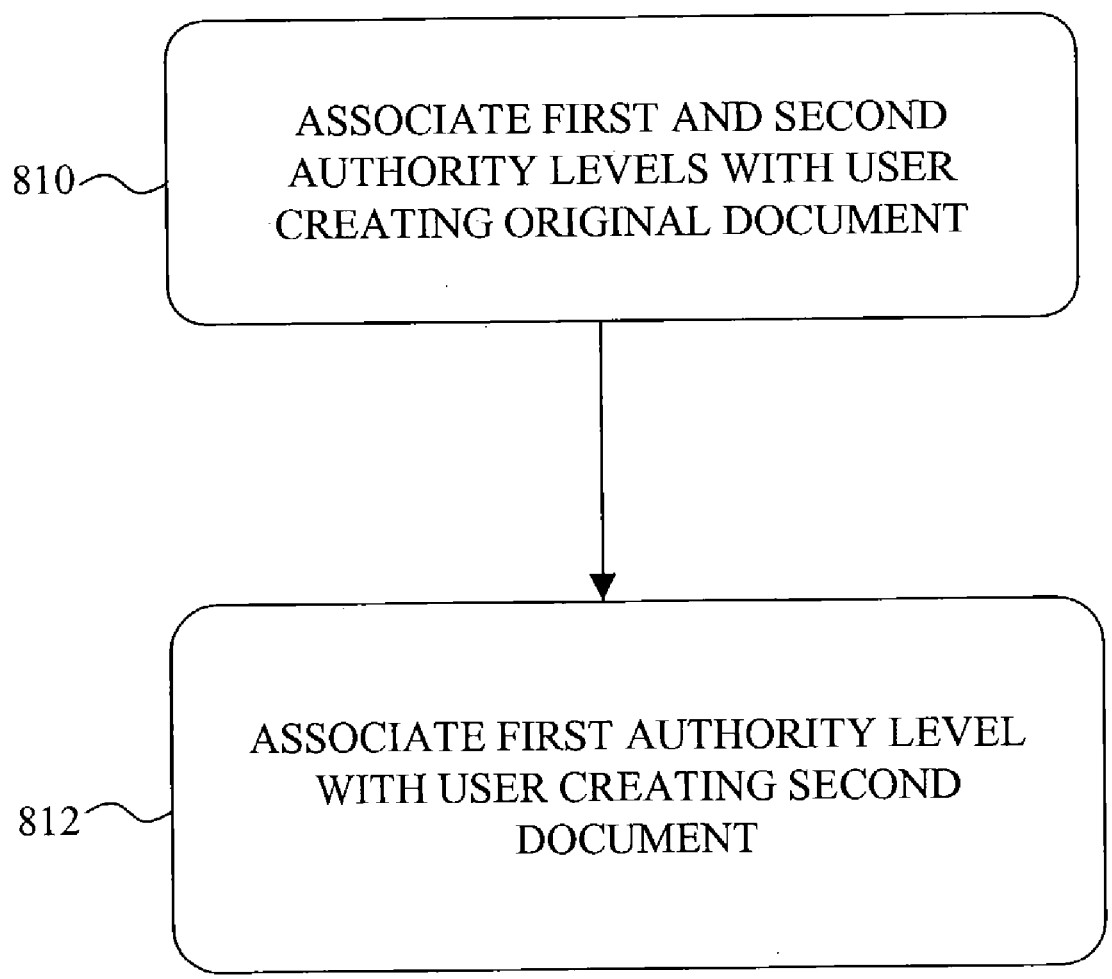
FIG. 8 is a flow diagram of a method of managing documents according to an aspect of the present invention.

FIG. 8 is a flow diagram of a method for managing documents according to yet another aspect of the invention. In FIG. 8, security restricts access of an original document by a user creating a subsequent document based on the original document.

The original and second documents are created such as by following the steps of FIGS. 3 and 4. The second document may be translated directly from the original document, or indirectly through an intermediate document translated from the original document, as discussed further below.

First and second authority levels are associated with a first user creating the original document (step 810). The first and second authority levels provide a degree of access to the original documents and a subsequent chain of documents translated therefrom. The authority levels may be stored in the related information table 130 as part of the related information.

The original document is translated into a second document. This may be performed directly or indirectly through an intermediate document, where the second document is a translation of the intermediate document and the intermediate document is a translation of the original document. For example, the intermediate document may be in the form of a printed medium (such as paper or a transparency) and the printed medium may include an ID identifier associated with the ID of the original document. Further, the second document may be translated from the intermediate document by scanning the printed medium of the intermediate document.

A first authority level is associated with a second user creating the second document (step 812). The first authority level grants the second user access to related information of the second document in the related information table 130, but not to related information of the first document. The first and second authority levels grant access to the first user to related information of both the original and second documents in the related information table 130.

In this way, access to the original document may be prohibited to a user who creates a document based on the original document, but who did not create the original document. Conversely, the user who creates the original document may maintain access to all documents that derive from the original document and that are stored in the document repository 60.

Figure 9:
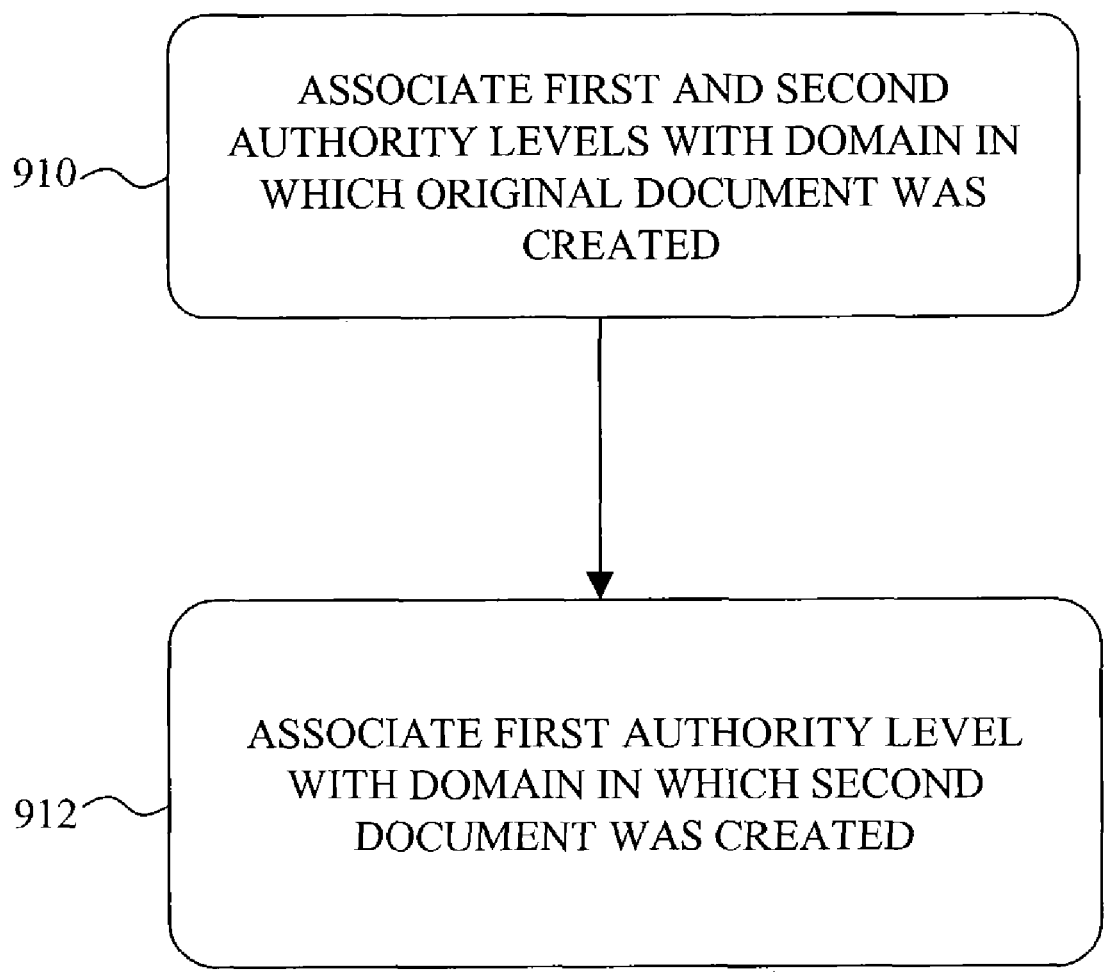
FIG. 9 is a flow diagram of a method of managing documents according to an aspect of the present invention.

FIG. 9 is a flow diagram of a method for managing documents according to yet a further aspect of the invention. The FIG. 9 method is similar to the FIG. 8 method except that the authority levels restrict access to documents based on the domain where the documents were created, instead of based on the user creating the documents. The system in which the FIG. 9 method operates has more than one domain. For example, the system may include a single server, but different domains served by the server. The system may also be a network including a number of servers, where the network is divided into more than one domain.

Original and second documents are created such as by the steps shown in FIGS. 3 and 4. The second document may translated directly from the original document, or indirectly through an intermediate document translated from the original document.

First and second authority levels are associated with the domain in which the original document was created (step 910). The first and second authority levels provide a degree of access to the original documents and a subsequent chain of documents derived therefrom by translations. In addition to the original document and the second document having the same ID, there may be additional documents ultimately derived from the original document and thus all having the same ID. Some of these additional related documents may have been created in the first domain, and some in the second domain. The authority levels may be stored in the related information table 130.

A first authority level is associated with the domain in which the second document was created (step 912). The first and second authority levels grant access in the first domain to related information of both the original and second documents and any other documents with the ID in the related information table. The first authority level grants access in the second domain to related information of the second document and any other documents created in the second domain with the ID, but not to related information of the first document or other documents created in the first domain.

In this way, access to the original document and related documents in the first domain may be prohibited in a different domain where a subsequent document was created based on the original document. Conversely, in the domain where the original document was created, access may be maintained to all documents that derive from the original document and that are stored in the document repository.

As yet another alternative, first level access could allow a user in the second domain to access the related information of related documents created in the first domain only where the related documents have a low level of security. For example, if a document is derived from the original document, and is created in the first domain, but is indicated as being a public document, such as a URL document, the first level access will allow a second domain user access to the related information for the URL document and the document.

As another alternative, the first level access may allow a user in the second domain to have limited (but not full) access to the related information of related documents created in the first domain. For example, the first level access may allow a user in the second domain to view some of the related information of related documents created in the first domain, but the user in the second domain may not be allowed to copy the information into a database in the second domain.

The foregoing description of preferred embodiments of the invention has been presented for purposes of illustration and description. It is not intended to be exhaustive or to limit the invention to the precise form disclosed, and modifications and variations are possible in light in the above teachings or may be acquired from practice of the invention. Any aspect can be combined with any other aspect. The embodiments were chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for managing documents, comprising:
    storing a first document having a first style in a document repository;
    creating an identification (ID) associated with the first document;
    providing a discernment information table, the discernment information table including the ID associated with the first document, wherein the discernment information table further includes a name of the first document;
    providing a related information table, the related information table including the ID and related information of the first document, the related information including at least an operational history of the first document;
    translating the first document to create a second document having a second style different from the first style, wherein the step of translating the first document to create the second document includes printing a copy of the first document onto a medium to create the second document;
    associating the ID with the second document and with related information of the second document, the related information including at least operational history of the second document, wherein the step of associating the ID with the second document includes printing the ID as an ID identifier onto the medium;
    modifying the medium of the second document;
    scanning the modified medium to translate the second document to create a third document having a third style different from the second style;
    reading the ID identifier;
    comparing the first document and the third document and determining that the medium has been modified;
    updating the discernment information table to include a name of the third document and to associate the ID with the third document; and
    modifying the related information table to include related information of the third document as associated with the ID, the related information including at least operational history of the third document and indicating that the third document is a modified version of the first document.

2. The method for managing documents according to claim 1, further comprising:
    extracting a modified portion of the third document based on the step of comparing the first document and the third document, and
    displaying the modified portion.

3. The method for managing documents according to claim 1, wherein the first document has a first document form and the third document has a third document form different from the first document form, and wherein the step of comparing the first document with the third document includes converting the first document into the third document form.

4. The method for managing documents according to claim 3, wherein the third document form is a bit map form.

5. A method for managing documents, comprising:
   storing a first document having a first style in a document repository;
   creating an identification (ID) associated with the first document;
   providing a discernment information table, the discernment information table including the ID associated with the first document, wherein the discernment information table further includes a name of the first document;
   providing a related information table, the related information table including the ID and related information of the first document, the related information including at least an operational history of the first document;
   translating the first document to create a second document having a second style different from the first style;
   associating the ID with the second document and with related information of the second document, the related information including at least operational history of the second document;
   associating with a first user creating the first document, a first authority level and a second authority level;
   associating with a second user creating the second document, the first authority level;
   wherein the first and second authority levels grant access to related information of the first and second documents in the related information table; and
   wherein the first authority level grants access to related information of the second document in the related information table, but not access to related information of the first document in the related information table.

6. A method for managing documents, comprising:
   storing a first document having a first style in a document repository;
   creating an identification (ID) associated with the first document;
   providing a discernment information table, the discernment information table including the ID associated with the first document, wherein the discernment information table further includes a name of the first document;
   providing a related information table, the related information table including the ID and related information of the first document, the related information including at least an operational history of the first document;
   translating the first document to create a second document having a second style different from the first style;
   associating the ID with the second document and with related information of the second document, the related information including at least operational history of the second document;
   associating with a first domain in which the first document was created, a first authority level and a second authority level;
   associating with a second domain in which the second document was created, the first authority level;
   wherein the first and second authority levels grant access in the first domain to related information of the first and second documents in the related information table; and
   wherein the first authority levels grants access in the second domain to related information of the second document in the related information table.

7. The method for managing documents according to claim 6, wherein the first authority level does not provide any access to related information of the first document, created in the first domain, in the related information table.

8. The method for managing documents according to claim 6, wherein the first document has one of a first security level and a second security level, wherein the first security level is lower than the second security level, and
   wherein the first authority level does not provide access, in the second domain, to the related information of the first document if the first document has the second security level.

9. The method for managing documents according to claim 6, wherein the first document has one of a first security level and a second security level, wherein the first security level is lower than the second security level, and wherein, if the first document has the second security level, the first authority level can view, in the second domain, the related information of the first document, but cannot copy the related information of the first document.

10. The method for managing documents according to claim 6, wherein the related information of the first document includes first security level information and second security level information, wherein the first security level information has a lower security level than the second security level information, and
    wherein, the first authority level can access, in the second domain, the related information of the first document that is first security level information but not the related information of the first document that is second security level information.

11. A document management system, comprising:
    a processor; and
    a memory, coupled to the processor, the memory having a discernment information table and a related information table,
    wherein the processor is configured for:
    storing a first document having a first style in a document repository;
    creating an identification (ID) associated with the first document;
    providing a discernment information table, the discernment information table including the ID associated with the first document;
    providing a related information table, the related information table including the ID and related information of the first document, the related information including at least an operational history of the first document;
    translating the first document to create a second document having a second style different from the first style, wherein the step of translating the first document to create the second document includes printing a copy of the first document onto a medium to create the second document;
    associating the ID with the second document and with related information of the second document, the related information including at least operational history of the second document, wherein the step of associating the ID with the second document includes printing the ID as an ID identifier onto the medium;
    modifying the medium of the second document;
    scanning the modified medium to translate the second document to create a third document having a third style different from the second style;
    reading the ID identifier;
    comparing the first document and the third document and determining that the medium has been modified;

updating the discernment information table to include a name of the third document and to associate the ID with the third document; and modifying the related information table to include related information of the third document as associated with the ID, the related information including at least operational history of the third document and indicating that the third document is a modified version of the first document.

12. The document management system according to claim 11, the processor further configured for:

extracting a modified portion of the third document based on the step of comparing the first document and the third document, and displaying the modified portion.

13. The document management system according to claim 11, wherein the first document has a first document form and the third document has a third document form different from the first document form, and wherein the step of comparing the first document with the third document includes converting the first document into the third document form.

14. The document management system according to claim 13, wherein the third document form is a bit map form.

15. A document management system, comprising:

a processor; and a memory, coupled to the processor, the memory having a discernment information table and a related information table, wherein the processor is configured for:

storing a first document having a first style in a document repository;

creating an identification (ID) associated with the first document;

providing a discernment information table, the discernment information table including the ID associated with the first document;

providing a related information table, the related information table including the ID and related information of the first document, the related information including at least an operational history of the first document;

translating the first document to create a second document having a second style different from the first style;

associating the ID with the second document and with related information of the second document, the related information including at least operational history of the second document;

associating with a first user creating the first document, a first authority level and a second authority level;

associating with a second user creating the second document, the first authority level;

wherein the first and second authority levels grant access to related information of the first and second documents in the related information table; and wherein the first authority level grants access to related information of the second document in the related information table, but not access to related information of the first document in the related information table.

16. A document management system, comprising;

a processor; and a memory, coupled to the processor, the memory having a discernment information table and a related information table, wherein the processor is configured for:

storing a first document having a first style in a document repository;

creating an identification (ID) associated with the first document;

providing a discernment information table, the discernment information table including the ID associated with the first document;

providing a related information table, the related information table including the ID and related information of the first document, the related information including at least an operational history of the first document;

translating the first document to create a second document having a second style different from the first style;

associating the ID with the second document and with related information of the second document, the related information including at least operational history of the second document;

associating with a first domain in which the first document was created, a first authority level and a second authority level;

associating with a second domain in which the second document was created, the first authority level;

wherein the first and second authority levels grant access in the first domain to related information of the first and second documents in the related information table; and wherein the first authority levels grants access in the second domain to related information of the second document in the related information table.

17. The document management system according to claim 16, wherein the first authority level does not provide any access to related information of the first document, created in the first domain, in the related information table.

18. The document management system according to claim 16, wherein the first document has one of a first security level and a second security level, wherein the first security level is lower than the second security level, and wherein the first authority level does not provide access, in the second domain, to the related information of the first document if the first document has the second security level.

19. The document management system according to claim 16, wherein the first document has one of a first security level and a second security level, wherein the first security level is lower than the second security level, and wherein, if the first document has the second security level, the first authority level can view, in the second domain, the related information of the first document, but cannot copy the related information of the first document.

20. The document management system according to claim 16, wherein the related information of the first document includes first security level information and second security level information, wherein the first security level information has a lower security level than the second security level information, and wherein, the first authority level can access, in the second domain, the related information of the first document that is first security level information but not the related information of the first document that is second security level information.

* * * * *